United States Patent [19]

Nilsson

[11] Patent Number: 4,710,268

[45] Date of Patent: Dec. 1, 1987

[54] METHOD FOR REGULATING THE PRESSURE OF BLOW-THROUGH DISCHARGE STEAM FROM A REBOILER OF PROCESS STEAM PRODUCED DURING PRODUCTION OF MECHANICAL PULP

[75] Inventor: Bengt H. Nilsson, Skoghall, Sweden

[73] Assignee: Kamyr AB, Karlstad, Sweden

[21] Appl. No.: 876,935

[22] Filed: Jun. 20, 1986

[30] Foreign Application Priority Data

Jun. 24, 1985 [SE] Sweden ............................ 85031177

[51] Int. Cl.$^4$ .............................................. B21B 1/12
[52] U.S. Cl. ...................................... 162/23; 162/28; 162/46; 162/47; 241/28
[58] Field of Search ....................... 162/23, 26, 28, 46, 162/47, 68, 249, 250; 241/28, 244

[56] References Cited

U.S. PATENT DOCUMENTS

| | | | |
|---|---|---|---|
| 4,231,842 | 11/1980 | Ojala | 162/47 |
| 4,326,913 | 4/1982 | Mattsson | 162/47 |
| 4,532,413 | 7/1985 | Ahonen | 162/47 |
| 4,537,655 | 8/1985 | Henriksson et al. | 162/23 |
| 4,555,254 | 11/1985 | Fisher | 162/47 |

OTHER PUBLICATIONS

Blumberg, "TMP Clean Steam Recovery for Paper Drying", *TAPPI Journal*, vol. 60, No. 6, p. 69, Jun. 1983.

TAPPI, Jun. 1983, pp. 69-70.
Pulp and Paper Magazine, Jun. 1983, pp. 113-117.

*Primary Examiner*—Steve Alvo
*Attorney, Agent, or Firm*—Nixon & Vanderhye

[57] ABSTRACT

A method and system for efficient heat recovery during the production of mechanical pulp treats the process steam inherently produced during the production of mechanical pulp to maximize the energy content of clean steam produced. Comminuted cellulosic material is refined in one or more refiners, and the mixture of mechanical pulp and process steam from the refiner is separated into process steam and pulp flows by a cyclone. The process steam is passed to a scrubber, and then to an inlet of a reboiler (steam transformer) which produces clean steam and discharged flow-through process steam. The conduit between the cyclone and the scrubber is open so that the pressure of the process steam before it enters the reboiler is not significantly affected; a buffer may be provided in the conduit, however, to damp process steam pressure variations. The pressure of the discharge blow through steam from the reboiler is regulated so as to maximize the energy content, pressure, and/or temperature of the clean steam produced, and the reboiler inherently acts as a buffer. This pressure regulation is practiced by providing a valve in the process steam outlet from the reboiler.

10 Claims, 4 Drawing Figures

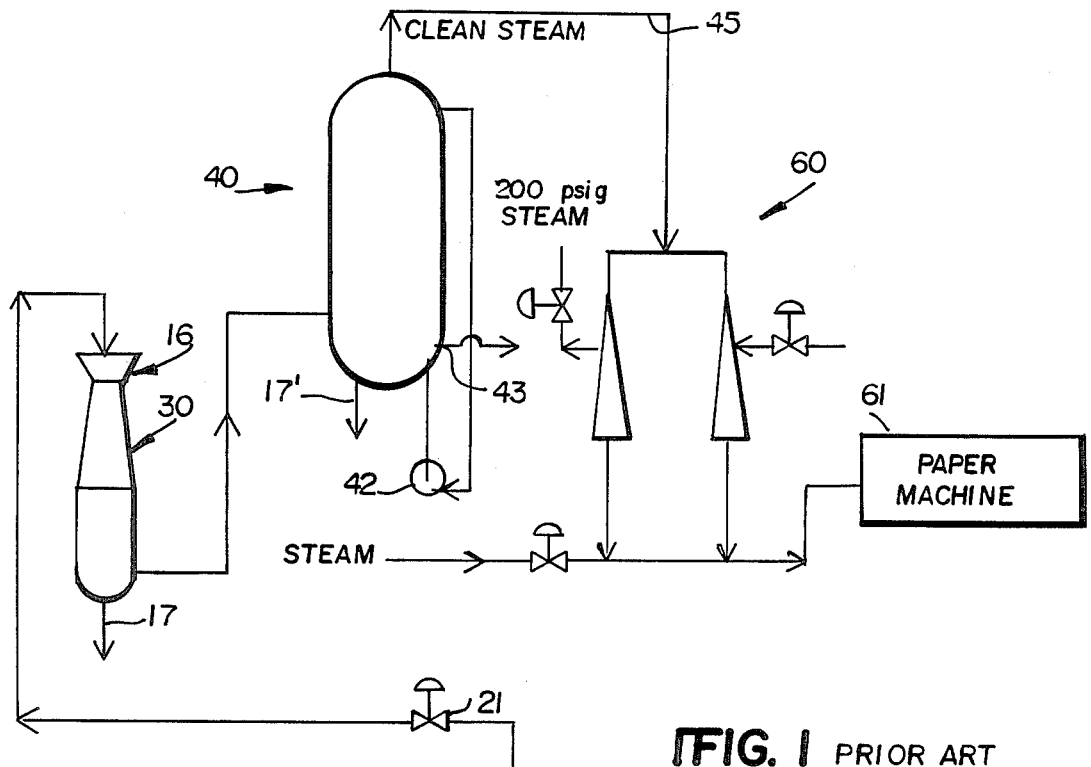
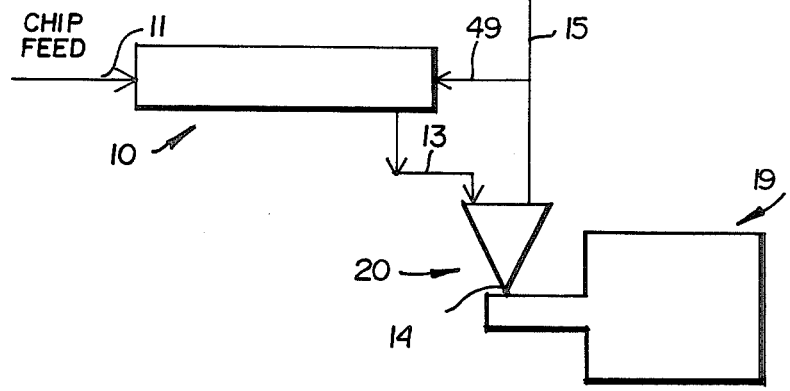
FIG. 1 PRIOR ART
FIG. 4
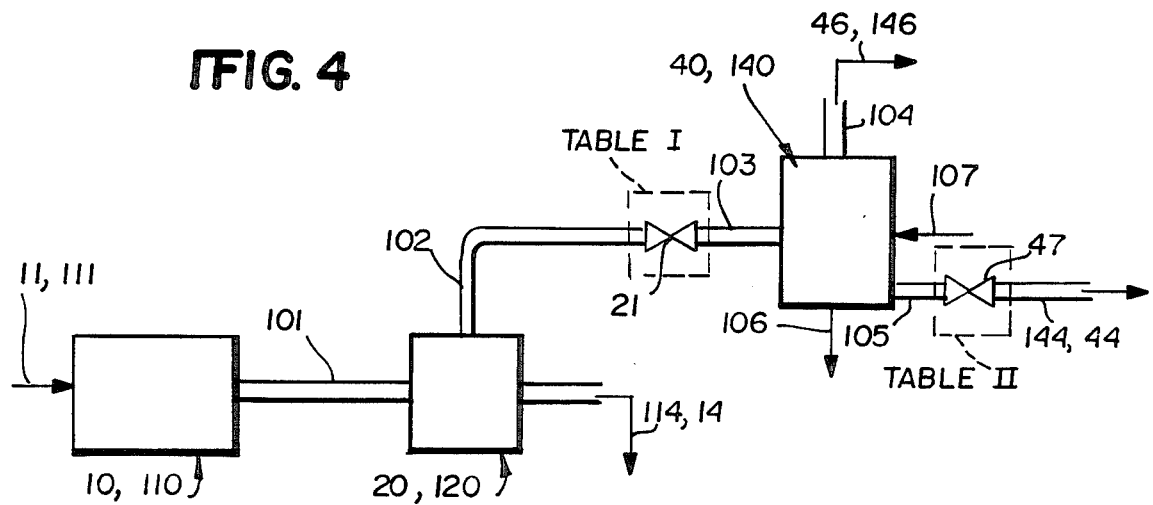

METHOD FOR REGULATING THE PRESSURE OF BLOW-THROUGH DISCHARGE STEAM FROM A REBOILER OF PROCESS STEAM PRODUCED DURING PRODUCTION OF MECHANICAL PULP

BACKGROUND AND SUMMARY OF THE INVENTION

In the production of mechanical pulp, such as RMP, TMP, CMP, or CTMP, from comminuted cellulosic fibrous material (e.g. wood chips), it is desirable to effectively recover and use the energy content of the process steam which is inherently produced during the refining process. This process steam is produced by the frictional heat which is developed by relative movement of the refiner components. It is of course also desirable to control the working conditions of the refiner so that it operates optimally, while still making maximum effective utilization of the energy content of the process steam.

In a representative prior art heat recovery system associated with a refiner, described in TAPPI June, 1983 issue, at pages 69 through 70, and Pulp & Paper Magazine, June, 1983 issue, at pages 113 through 117, a system is provided in which clean steam produced from the refiner process steam, in a reboiler, is utilized in conjunction with paper machines operating at the mill, or in other desirable manners. In such a prior art system, refining takes place at superatmospheric pressures which are maintained by means of a regulating valve operatively disposed in the process steam line between the refiner and the reboiler, typically between a separator and a scrubber which are disposed in that line. While such a system does allow significant heat recovery, it also has a number of drawbacks associated with it. For instance, because the valve is disposed in the process line between the refiner and the reboiler a pressure reduction, followed by an inherent temperature decrease, takes place. This means that the reboiler operates at a lower temperature than desirable, with the result that the clean steam produced does not have as high as energy content as possible. Further, in such a prior art system the steam volume before the regulating valve may be too small to obtain effective and stable regulation of the refiner working pressure (which is desirable). For example, such a system may be too susceptible to pressure variations in the process steam line.

According to the present invention, a method and apparatus are provided which overcome the drawbacks in the prior art heat recovery system mentioned above. That is according to the present invention, it is possible to obtain significantly more stable process steam pressure control, so that the working pressure on the refiner or refiners may be controlled to result in more effective energy recovery and a more desirable final product. Additionally, the energy content of the clean steam produced in the reboiler is enhanced, making it much more desirable for any end use to which it is put.

The basic features of the inventive method and apparatus which produce the desired end results that are achieved according to the invention, are primarily related to the repositioning of the pressure control valve that is utilized in the prior art heat recovery steam described above. In particular, according to the present invention the pressure regulating valve is removed from the process line between the refiner and the reboiler, and a pressure regulating valve is utilized in the blow-through process steam discharge from the reboiler. This "seemingly" small change has dramatic results. It allows the reboiler to produce clean steam having a higher temperature and/or pressure, effectively having a higher energy content, so that the amount of useful energy that is recovered from the system is increased. Also, the reboiler then effectively acts as a buffer, or damping means, for damping pressure pulsations which may occur in the process steam line. This allows feedback of process steam to the refiner or refiners, to control the working pressure thereof so that the refining operation is more efficient, this too resulting in more effective energy recovery and/or a better quality (more uniform) pulp.

It is the primary object of the present invention to provide for effective heat recovery and efficiency of operation during the production of mechanical pulp. This and other objects of the invention will become clear from an inspection of the detailed description of the invention, and from the appended claims.

BRIEF DESCRIPTION OF THE DRAWINGS

FIG. 1 is a schematic representation of an exemplary prior art heat recovery system in the production of mechanical pulp;

FIG. 4 is a diagrammatic view illustrating various steam flows which are present in both the prior art and inventive systems, for the purposes of comparison in tabular format.

DETAILED DESCRIPTION OF THE DRAWINGS

Figure 2:
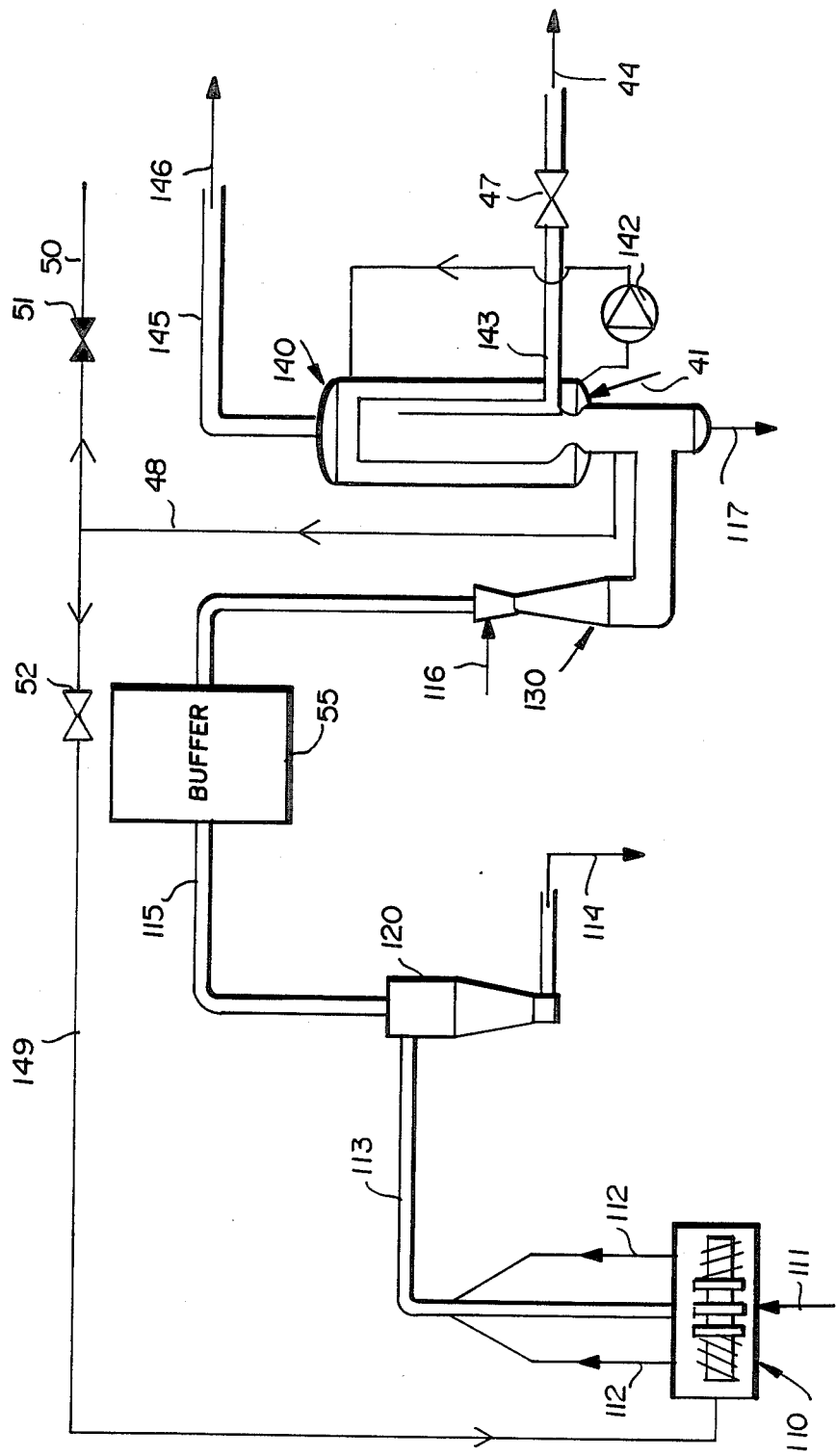
FIG. 2 is a schematic view of an exemplary heat recovery system according to the invention.

The prior art system illustrated schematically in FIG. 1 is the heat recovery system described in the TAPPI, and Pulp & Paper Magazine articles of June, 1983, referenced above. In particular, the prior art heat recovery system includes a conventional refiner 10 to which chips are fed in line 11, the chips slurried with water and having a high consistency. During action of the refiner relatively movable components on the chips in the chip slurry, mechanical pulp and process steam are produced, which are discharged from the refiner 10 in line 13, and pass to a conventional pulp/steam separating means 20, which preferably comprises a conventional cyclone. The mechanical pulp which has been separated passes from cyclone 20 in line 14 to any suitable other processing stages, diagrammatically indicated at 19 in FIG. 1, for example for the production of CMP, CTMP, etc.

The process steam discharged from the cyclone 20 passes in line 15 ultimately to a venturi scrubber 30, or the like, which cleans up the process steam a significant amount. From the scrubber 30 the process steam passes to a conventional steam transformation means, commonly called a reboiler, 40. Significantly, in the prior art system illustrated in FIG. 1, a pressure control valve 21 is disposed in line 15, typically between the cyclone 20 and the scrubber 30, but in any event operatively between the refiner 10 and the reboiler 40.

Particles typically leave the bottom of the scrubber 30 through line 17, while condensate from reboiler 40 passes downwardly from the reboiler through line 17'. A recirculation pump 42 is associated with the reboiler 40 to pump recirculated water, along with feed water, up into the reboiler 40 where it is transformed to fresh steam by indirect contact (through a heat exchange apparatus) with the process steam from line 15. Blow-through steam is discharged into line 43. The clean steam that is produced in reboiler 40 is discharged from it in line 45 and passes to any suitable utilization device. In the particular exemplary prior art system illustrated in FIG. 1, the clean steam in line 45 is compressed in a pair of thermocompressors, 60, and ultimately is fed to a low pressure header which supplies the dryers on a paper machine, illustrated schematically at 61. Some of the process steam in line 15, before pressure reduction by valve 21, is fed in line 49 to control the working pressure of the refiner 10.

An exemplary system according to the present invention is illustrated schematically in FIG. 2. In FIG. 2, structures generally comparable to the structures illustrated in the FIG. 1 prior art system are indicated by the same two digit reference numeral, only preceded by a "1".

In the inventive system of FIG. 2, slurried wood chips or the like are fed in line 111 to a refiner 110, the mechanical pulp produced by the refiner being discharged into line 113, with process steam produced from the liquid content of the slurry in the refiner 110 passing into lines 112, which are joined with line 113. The mixture of mechanical pulp and process steam is fed to the cyclone separating means 120, with the mechanical pulp passing through line 114 to be used or otherwise treated as desired, while the separated process steam passes into line 115.

The words "refiner" and "refining" as used in the present specification and claims are used in their broadest sense, and cover all types of apparatus or procedures for mechanically producing pulp from a feed of cellulosic comminuted material, such as screw devices and procedures, grinding devices and procedures, and the like.

Preferably, the process steam in line 115 passes to a venturi scrubber 130 in which liquid, typically water, is added as indicated by arrow 116. The process steam then continues onto steam transformer (reboiler) 140. Particles leaving the scrubber 130, together with condensate from the reboiler 140, pass out of the system through line 117. Feed water is added to the reboiler 140 as indicated by arrow 41, and pumped by means of the recirculating pump 142 into the steam transformer 140, where it is transformed to clean steam by indirect contact with the process steam through a conventional heat exchange arrangement, such as a falling film evaporator. A small part of the process steam, referred to as the blow-through steam, is discharged from the reboiler 140 in line 143, ultimately passing in line 44 and then typically being sewered, or passed to low grade heat recovery. The clean steam from the reboiler 140 passes in line 145, ultimately passing, as indicated by arrow 46, to a station in which it may be utilized, such as a paper machine.

A small part of the process steam may be returned to the refiner 110 via lines 48 and 149, with valve 52 provided in line 149 in order to stabilize the steam pressure and/or to regulate the amount of steam passing to the refiner 110. Alternatively, the steam may pass into line 50 through safety valve (pressure relief valve) 51, to be utilized elsewhere as desired.

According to the present invention, the conduits between the refiner 110 and the reboiler 140 are essentially open, that is they do not significantly affect the pressure of the process steam passing therethrough. However a pressure regulating valve 47 is disposed in the blow-through steam discharge line 43. The valve 47 regulates the pressure of the discharged blow-through steam from the reboiler 140 so as to maximize the energy content of the clean steam which is discharged at line 145. That is the temperature and/or pressure of the clean steam in line 145 is enhanced compared to the prior art system illustrated in FIG. 1, resulting in more effective energy recovery.

Valve 47 may be any type of valve capable of regulating the flow of "dirty" process steam. One exemplary type valve is a ball valve sold by Neles Inc. of Glens Falls, New York under the trademark "STEM-BALL".

It is also noted that utilizing the system of FIG. 2, the steam volume in the reboiler 140 functions as a buffer, and damps pressure variations that may occur in the process steam transport lines. In a plant of typical size, the reboiler 140 would have a steam volume of approximately 4 cubic meters. This would often provide the desired necessary damping of pressure pulsations in the process steam conduits. However in installations where even further damping action was necessary, an additional buffer 55 could be provided in the line 115. The buffer 55 would not, however, have any significant effect on the pressure of the process steam between the refiner 110 and the reboiler 140, and thus would not occasion the drawbacks discussed above with respect to the typical prior art system illustrated in FIG. 1.

Figure 3:
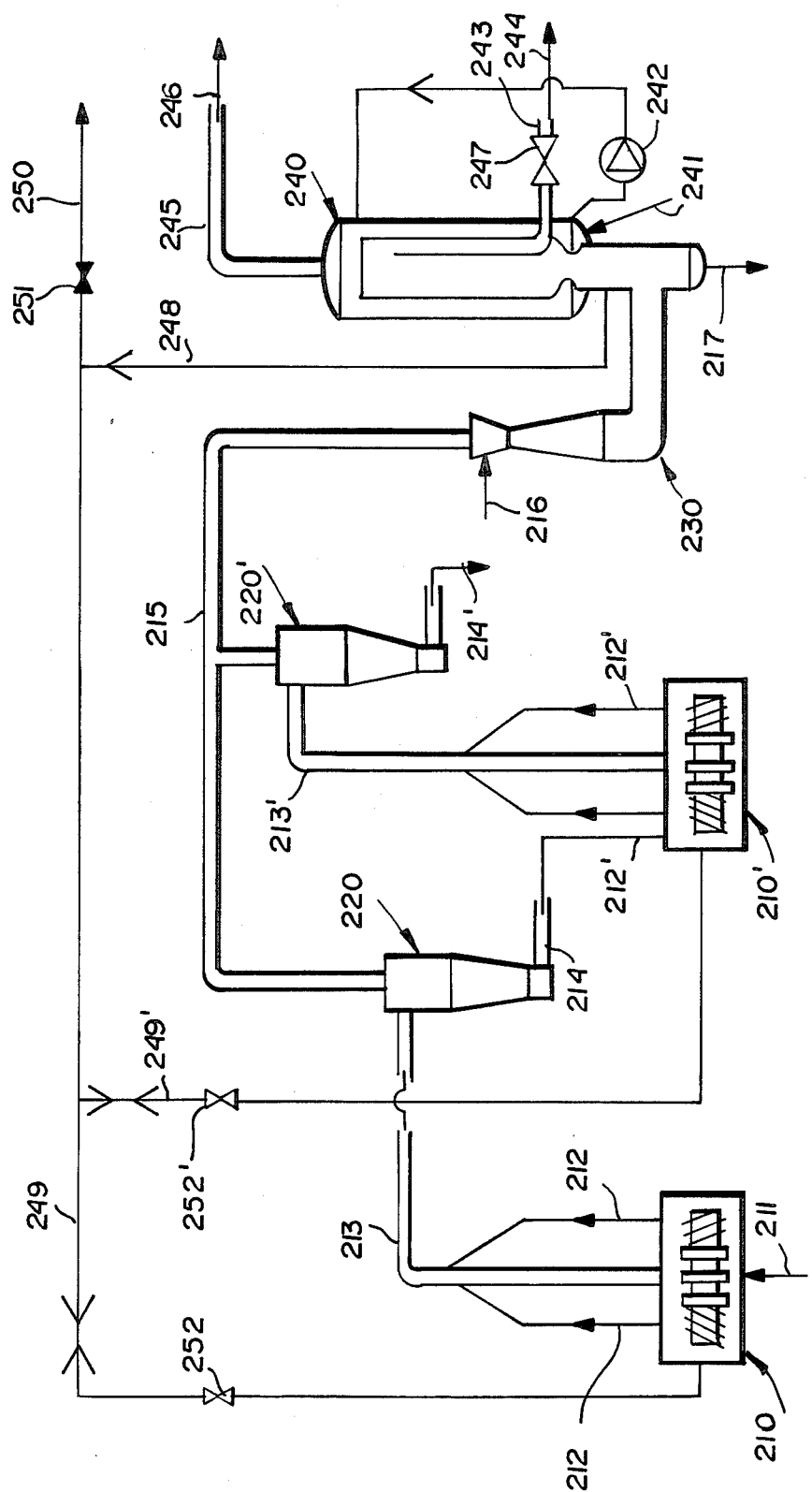
FIG. 3 is a schematic view of an alternative embodiment of the heat recovery system according to the invention.

FIG. 3 illustrates another, alternative, embodiment of the system according to the invention in which primary and secondary refiners are utilized. In the FIG. 3 embodiment, structures corresponding to those in the FIG. 2 embodiment are illustrated by the same two digit reference numeral, only preceded by a "2".

In the system of FIG. 3, a primary refiner 210 and a secondary refiner 210' are provided, two separating means 220, 220' are provided, with a common process steam line 215 extending from the separators 220, 220'. The mechanical pulp from the first refiner 210 passes in line 214 to the secondary refiner 210', with the mechanical pulp ultimately produced being discharged in line 214' for subsequent use or further treatment.

A small volume of process steam is drawn from line 248, and is fed via lines 249, 249' through control valves 252, 252', respectively, to the first and second refiners 210, 210', respectively. This process steam acts on the refiners 210, 210' to control the working pressure thereof. Typically, this process steam could be added to increase the working pressure on one of the refiners, and decrease the working pressure on the other. Suitable automatic controls, such as a computer control system, can be provided operatively connected to the valves 252, 252', and the pressure regulating valve 247, to control the various steam supplies and discharges, so as to achieve the desired efficient operation. Also, an alarm system can be provided in order to indicate aberrant conditions, which can then be corrected.

During falling operating pressure in the refiner 210, or 210', the valves 252, 252' may automatically be controlled to supply additional process steam to the refiners. Built-in pressure adjustment takes place in view of the equalizing volume of the process steam and by the throttling of the quantity of blow-through steam through the valve 247. If increasing operating pressure takes place in a refiner 210, 210' the pressure regulation works by increasing the quantity of blow-through steam through the regulating valve 247, and in addition built-in pressure adjustment takes place by the equalizing volume of the process steam. Also, the safety valve 251 may open, resulting in a discharge of process steam; the alarm may be connected to the valve 251 to indicate when it opens.

Advantageous results that can be achieved according to the invention are indicated by reference to the diagrammatic representations in FIG. 4, and the following Tables I and II. FIG. 4 illustrates diagrammatically the major components of the prior art system of FIG. 1, and their counterparts of the embodiment of FIG. 2, and labels with a reference numeral the steam flow lines between each of the components, or from the components. The system when utilizing the valve 21 of the exemplary prior art of FIG. 1, is tabulated in Table I, while the results achieved according to the invention utilizing the valve 47, and not the valve 21, are tabulated in Table II. Note from FIG. 4 that the various steam flows are as follows:

101 Process steam from refiner 10, 110 to separator 20, 120;
102 Process steam from separator 20 to valve 21;
103 Process steam after valve 21, to steam transformer 40;
102, 103 Process steam from separator 120 to steam transformer 140;
104 Clean steam from steam transformer 40;
105 Remaining (blow-through) process steam;
106 Condensate from steam transformer 40;
107 Feed water to steam transformer 40.

In the following Tables I and II, values have been calculated based on a production of 10 metric tons absolute dry pulp per hour, that is 10 BDMT/h. For Table I, the process steam is saturated at the inlet to the steam transformer, and the pressure across the regulating valve is 0.6 bar and in the steam transformer 0.4 bar. By comparing steam flow 104 in the Tables, that is the clean steam that is produced, it is apparent that the steam pressure and heat content according to the invention (Table II) is higher than for the prior art system of Table I. Even a small pressure increase in the clean steam can be a significant factor into how effectively that steam can be utilized.

TABLE I

Using Valve 21, before steam transformer 40
Steam, Water, Condensate

| Item | Pressure bar (abs) | Temperature °C. | Quantity T/BDMT |
|---|---|---|---|
| 101 | 5.0 | 151.85 | 1.200 |
| 102 | 4.9 | 151.09 | 1.200 |
| 103 | 4.3 | 146.25 | 1.203 |
| 104 | 3.9 | 142.72 | 1.099 |
| 105 | 4.3 | 146.25 | 1.096 |
| 106 | 4.3 | 146.25 | 1.107 |
| 107 | — | 141.79 | 1.099 |

TABLE II

Using Valve 47 after steam transformer 140
Steam, Water, Condensate

| Item | Pressure bar (abs) | Temperature °C. | Quantity T/BDMT |
|---|---|---|---|
| 101 | 5.0 | 151.85 | 1.200 |
| 102, 103 | 4.9 | 151.09 | 1.200 |
| 104 | 4.5 | 147.92 | 1.085 |
| 105 | 4.9 | 151.09 | 1.096 |
| 106 | 4.9 | 151.09 | 1.104 |
| 107 | — | 141.79 | 1.085 |

It will thus be seen that according to the present invention an effective method and apparatus have been provided for effectively recovering energy from the process steam during the production of mechanical pulp. While the invention has been herein shown and described in what is presently is conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent systems and methods.

What is claimed is:

1. A method of producing steam during the refining of finely comminuted cellulosic fibrous material to produce mechanical pulp, comprising the steps of:
    (a) refining the finely comminuted cellulosic fibrous material to produce a mixture of mechanical pulp and superatmospheric pressure process steam which is inherently produced during the refining action;
    (b) separating the process steam from the mechanical pulp;
    (c) reboiling the process steam in a reboiler to produce clean steam and discharged blow-through process steam; and
    (d) regulating the pressure of the discharged blow-through steam from the reboiler so as to maximize the energy content of the clean steam produced in step (c), the boiler having a blow-through process steam outlet through which the blow-through steam is discharged, the blow-through steam being kept separate from the clean steam, and wherein step (d) is practiced by providing a regulating valve in the blow-through process steam outlet from the reboiler, and providing no significant pressure change of the process steam from step (b) to step (c).

2. A method as recited in claim 1 further comprising the step of scrubbing the process steam between steps (b) and (c).

3. A method as recited in claim 1 wherein step (a) is practiced utilizing a refiner having a working pressure, and wherein said method comprises the further step of applying a portion of the process steam prior to step (c) to the refiner to control the working pressure thereof.

4. A method as recited in claim 1 wherein step (a) is practiced in a two-step refining process, and wherein step (b) is practiced for the discharge of mechanical pulp and process steam from each of the two steps of the refining process, and wherein the process steam from both separating steps is passed to step (c).

5. A method as recited in claim 4 wherein step (a) is practiced by primary and secondary refiners, each having a working pressure, and comprising the further step of passing a portion of the process steam from prior to step (c) back to the primary and secondary refiners, to increase the working pressure of one of the refiners, and to decrease the working pressure of the other.

6. A method as recited in claim 1 comprising the further step of providing a buffer volume in the pathway of the passage of steam between steps (b) and (c) in order to damp process steam pressure variations.

7. A method of producing steam during the refining of finely comminuted cellulosic fibrous material to produce mechanical pulp, comprising the steps of:
    (a) refining the finely comminuted cellulosic fibrous material to produce a mixture of mechanical pulp and superatmospheric pressure process steam which is inherently produced during the refining action;

(b) separating the process steam from the mechanical pulp;

(c) reboiling the process steam in a reboiler to produce clean steam; and (d) regulating the pressure of the process steam within the reboiler while providing for the reboiler to act as a buffer for damping of process steam pressure variations, to maximize the pressure and temperature of the clean steam produced in step (c), the boiler having a blow-through process steam outlet through which the blow-through steam is discharged, the blow-through steam kept separate from the clean steam, and wherein step (d) is practiced by providing a regulating valve in the blow-through process steam outlet from the reboiler, and providing no significant pressure change of the process steam from step (b) to step (c).

8. A method as recited in claim 7 herein step (a) is practiced utilizing a refiner having a working pressure, and wherein said method comprises the further step of applying a portion of the process steam prior to step (c) to the refiner to control the working pressure thereof.

9. A method as recited in claim 7 comprising the further step of providing a buffer volume in the pathway of the passage of steam between steps (b) and (c) in order to damp process steam pressure variations.

10. A method as recited in claim 7 wherein step (a) is practiced in a two-step refining process, and wherein step (b) is practiced for the discharge of mechanical pulp and process steam from each of the two steps of the refining process, and wherein the process steam from both separating steps is passed to step (c); and wherein step (a) is practiced by primary and secondary refiners, each having a working pressure, and comprising the further step of passing a portion of the process steam from prior to step (c) back to the primary and secondary refiners, to increase the working pressure of one of the refiners, and to decrease the working pressure of the other.

* * * * *